United States Patent
Jöhnßen et al.

(10) Patent No.: US 12,135,770 B2
(45) Date of Patent: Nov. 5, 2024

(54) METHOD AND SYSTEM FOR USER AUTHENTICATION

(71) Applicant: SIEMENS AKTIENGESELLSCHAFT, Munich (DE)

(72) Inventors: Oliver Jöhnßen, Nuremberg (DE); Daniel Krüger, Roth (DE); Florian Kubo, Bavaria (DE)

(73) Assignee: Siemens Aktiengesellschaft, Munich (DE)

( * ) Notice: Subject to any disclaimer, the term of this patent is extended or adjusted under 35 U.S.C. 154(b) by 237 days.

(21) Appl. No.: 17/621,431

(22) PCT Filed: Jun. 26, 2019

(86) PCT No.: PCT/EP2019/066938
§ 371 (c)(1),
(2) Date: Dec. 21, 2021

(87) PCT Pub. No.: WO2020/259818
PCT Pub. Date: Dec. 30, 2020

(65) Prior Publication Data
US 2022/0414194 A1    Dec. 29, 2022

(51) Int. Cl.
*G06F 21/32* (2013.01)
*G06F 21/31* (2013.01)

(52) U.S. Cl.
CPC ............ *G06F 21/32* (2013.01); *G06F 21/316* (2013.01)

(58) Field of Classification Search
CPC ................................ G06F 21/32; G06F 21/316
See application file for complete search history.

(56) References Cited

U.S. PATENT DOCUMENTS

| | | | |
|---|---|---|---|
| 11,176,231 B2* | 11/2021 | Whaley | G06F 21/32 |
| 2013/0114865 A1 | 5/2013 | Azar et al. | |
| 2013/0343616 A1* | 12/2013 | Forero | G06F 21/32 382/115 |
| 2016/0063227 A1* | 3/2016 | Kobres | G10L 17/00 726/3 |
| 2017/0124362 A1* | 5/2017 | Sheng | G06K 7/10396 |

OTHER PUBLICATIONS

Notification of the Submission of the International Provisional Patentability Report for International Patent Application No. PCT/EP2019/066938 mailed May 25, 2021.
PCT International Search Report and Written Opinion of International Searching Authority mailed Mar. 19, 2020 corresponding to PCT International Application No. PCT/EP2019/066938.

* cited by examiner

*Primary Examiner* — Hee K Song
(74) *Attorney, Agent, or Firm* — Lempia Summerfield Katz LLC

(57) ABSTRACT

In order to make user authentication for accessing an access-protected apparatus (10) quicker and more convenient, what is specified is a user authentication method in which a mobile electronic device (8) is used to capture biometric information of a user (9) of the device (8) during a recording interval. A computer system (6) is used to determine a confidence value on the basis of the biometric information. An authentication unit (7) is used to establish that the device is located within predefined surroundings of an apparatus (10). The authentication unit (7) is used to authorize access to the apparatus (10) on the basis of the confidence value.

13 Claims, 3 Drawing Sheets

METHOD AND SYSTEM FOR USER AUTHENTICATION

CROSS REFERENCE TO RELATED APPLICATIONS

This present patent document is a § 371 nationalization of PCT Application Serial Number PCT/EP2019/066938, filed Jun. 26, 2019, designating the United States, which is hereby incorporated in its entirety by reference.

FIELD

Embodiments relate to a method for user authentication, a corresponding system and a software system.

BACKGROUND

User authentication takes place in many contexts, for example if different users are supposed to have admittance or access to a machine or a computer system.

Known approaches for authenticating a user are based on proof that information is known, for example a password or a PIN, or on possession of an item, for example a key or a chip card. Moreover, methods for recognizing biometric information, for example fingerprints or face shapes, may be used. A combination of such methods is also possible, for example by having to present a chip card and enter a PIN.

A common feature of known approaches is that the user wishing to gain access to the password-protected or access-protected apparatus must always himself take action in order to perform authentication, for example by entering the password into a user interface or placing his finger on an appropriate fingerprint sensor.

Accordingly, the user wastes time as a result of authentication. The time lost increases in the event of input errors or erroneous detections. Furthermore, active authentication is inconvenient for the user. Authentication methods that are based on the recognition of fingerprints or facial profiles additionally have the disadvantage that they may not be able to be performed immediately in every situation or during every activity of the user. If the user is wearing gloves, for example, the user first needs to remove the gloves in order to be able to use a fingerprint sensor. The situation is similar in the case of facial recognition if the user is wearing a protective mask, a hood, safety glasses or the like.

The authentication of a user by performing face biometrics is described in the document US 2013/0114865 A1, for example.

The document US 2016/0063227 A1 discloses a method for electronic authentication that takes previously ascertained input values as a basis for passively (that is to say without further input by a user) ascertaining a confidence value that is relevant to the performance of authentication of a user.

A method for authenticating a user is likewise known from the document US 2017/0124362 A1, the user here wearing a so-called "wearable", and the granting of access being able to be dependent on the respective use situation.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide user authentication that increases user convenience and at the same time reduces time lost as a result of the authentication process.

Embodiments are based on the idea of decoupling the actual authentication process from the time at which an access-protected apparatus is accessed by acquiring biometric information for authenticating the user in an earlier logging period and approving access to the access-protected apparatus in an automated manner on the basis of a confidence value of the biometric information.

According to an embodiment, a method for user authentication is specified. The method involves a mobile, electronic device used to acquire biometric information of a user of the device during a logging period. The biometric information is taken as a basis for determining a confidence value for an authenticity of the user by a computer system. An authentication unit is used to establish that the device is located in predetermined surroundings of an access-protected apparatus. The authentication unit is used to approve, for example automatically approve, access to the apparatus on the basis of the confidence value.

A mobile electronic device may be understood here and below to mean an electronic device that is configured to be carried, for example to be constantly carried, by a user of the device. The mobile electronic device may for example include a mobile phone, a smartphone, a tablet, a notebook, another portable computer system or a so-called wearable. Wearables or wearable computers may refer to computer systems or electronic devices that are worn on the body of the user or integrated in clothing of the user while being used. By way of example, smartglasses or smartwatches may be referred to as wearables.

Biometric information, that may for example also include anthropometric information, may be understood here and below to mean information that is suitable for automated recognition of individuals, based on their behavior and/or biological characteristics.

The logging period is for example a period or an accumulation of multiple adjacent or separate subperiods during which the user carries or uses the mobile electronic device. For example, the logging period comes before the apparatus is actually accessed, or access is approved by the authentication unit, in order to decouple the authentication process from the time of access.

The biometric information is for example collected, that is to say acquired and stored, by the electronic device during the logging period. The biometric information is acquired by appropriate sensors of the device or by sensors that are coupled or connected to the device.

The authenticity of the user tallies with the concordance between the actual user of the electronic device and a predetermined individual, for example. The confidence value for authenticity tallies with a confidence in or probability of the authenticity of the user being able to be inferred on the basis of the biometric information.

For example, the confidence value may be provided by the computer system on the basis of one or more comparisons of the biometric information with biometric reference information or reference data. The reference data may tally with biometric information for which the user may be assumed to be authentic with sufficient certainty, that is to say with a degree of probability above a predetermined limit, on the basis of independent information.

By way of example, the reference data may be produced or verified by combining acquisition of the biometric information with conventional methods for authentication, for example password entry or fingerprint recognition or other authentication methods based on knowledge and/or possession.

The authentication unit being used to establish that the device is located in the predetermined surroundings may be understood to mean that the authentication unit is used to check whether the device is located in the surroundings and this check is positive. For example, access to the apparatus is approved by the authentication unit on the basis of the confidence value if the authentication unit has established that the device is located in the predetermined surroundings.

The authentication unit includes for example a computing unit, for example a computing unit of the access-protected apparatus, that may communicate with the computer system wirelessly or by wire.

For example, the authentication unit may receive from the computer system the confidence value or data, for example authentication data, that are dependent on the confidence value or that are produced on the basis of the confidence value. The authentication data may contain for example a user identifier, a software identifier, a device identifier, a temporary access key, a username, and/or a password on an implementation-specific basis.

In order to establish that the device is located in the predetermined surroundings, the authentication unit may communicate for example with the mobile electronic device, for example wirelessly, or with a position determination device provided externally to the mobile electronic device, for example in the surroundings of the apparatus.

The communication between the authentication unit and the mobile electronic device may take place for example using RFID, NFC, Bluetooth, WLAN, or another radio connection.

The access-protected apparatus is for example an apparatus that is protected against unauthorized admittance or access and/or that includes multiple admittance or access categories, with for example different users being able to have admittance according to different admittance or access categories.

The access-protected apparatus may be for example an installation or machine, a data processing installation, a computer system, a door, a gate, or another closing apparatus.

Access to the apparatus being approved on the basis of the confidence value may for example be understood to mean that access is approved on the basis of whether the confidence value is greater than, equal to or less than a predetermined minimum value.

Access may include for example physical admittance to the apparatus, unlocking of the apparatus or of a user interface of the apparatus, read, write and/or use rights in a predetermined category, or the opportunity to use the apparatus. In the case of a door or a gate, for example, access may also include opening a lock of the door or the gate.

The confidence value may for example be time dependent. By way of example, the volume of data in the biometric information may increase during the logging period. The confidence value may for example likewise become greater with the larger volume of data if there is or continues to be consistency in the biometric data or information. The larger the volume of consistent biometric information supporting the authenticity of the user, the higher the confidence value may be.

Depending on the type of biometric information acquired, the logging period may extend from the order of magnitude of seconds or a few minutes through to several months or even longer. For example, the biometric information collected may also be used for further authentication processes for accessing the apparatus. The logging period may then for example be regarded as part of a further logging period for one of the further authentication processes.

Collection of the biometric information and corresponding, for example continuous, production and updating of the confidence value by the electronic device and the computer system ensure that access to the apparatus is approved in an automated manner only if the confidence value indicates that the device is carried by the legitimate user or the expected user.

A method thus effectively involves the period for which actual authentication takes place, namely the logging period, being decoupled from the time of actual access or at which access is approved.

Instead of performing the inspection of the biometric information only directly upon login or upon access to the apparatus, embodiments involve authenticity being guaranteed continuously in the background to a certain degree.

As a result, it is fundamentally no longer necessary for the user to take action in order to perform authentication. Embodiments describe for example passive authentication in the sense that the user automatically confirms his authenticity during normal use of the electronic device.

This means that when actual access is approved depending on the confidence value it is possible to dispense with active action by the user, that leads to a time saving and improved convenience for the user.

Normally, the user need neither remember passwords or the like nor carry specific objects for authentication.

The association of the biometric information with the user also allows an individual identification of the user and hence a role- or user-dependent approval of access.

The time lost and losses of convenience as a result of erroneous inputs or detections directly during login are also eliminated.

Since the acquisition of the biometric information takes place during the logging period, that may cover various work and life situations of the user, it is for example also not necessary for the applicable biometric parameters or measured values to be available at the time of the actual access to the apparatus, or the approval of the access. This allows restrictions for certain clothing, for example when wearing gloves, protective masks or safety glasses, to be avoided.

According to at least one embodiment of the method, access to the apparatus is automatically approved by the computer system if the confidence value is greater than or equal to the predetermined minimum value.

Automatic approval may for example be understood to mean that no active authentication action by the user is necessary. This may thus be referred to as passive authentication.

According to at least one embodiment, the authentication unit is used to output a request for an active authentication, for example to the user, if the confidence value is less than the predetermined minimum value or less than a further predetermined minimum value.

The request includes for example an optical, visual and/or audible signal on a display unit of the apparatus and/or on a display unit of the mobile electronic device. For example, the request includes a user instruction on a display of the apparatus or of the device that asks the user to or advises the user that he needs to perform an active authentication action in order to gain access to the apparatus.

The active authentication action may include for example entering a password or a PIN, using a key, an RFID sensor or a chip card or reading in biometric data, for example a fingerprint.

If the confidence value is less than the predetermined minimum value, this may mean that a person is carrying the mobile electronic device who is not permitted to do so or to access the apparatus. However, it may also mean that the biometric information differs from the reference data for other reasons. By way of example, the legitimate user may behave in a previously undetected manner, that means that a positive comparison against the reference data is not possible in this respect. A biometric characteristic contributing to the biometric information may also have permanently or temporarily changed for the legitimate user. By way of example, the user may have an illness, an injury or another physical change that temporarily or permanently changes a heart rate, a skin temperature, a pace length or another biometric characteristic.

In such a case, the request for active authentication provides a fallback level in order to ensure increased security, for example if this is currently not possible on the basis of the biometric information.

According to at least one embodiment, access to the apparatus is approved by the authentication unit on the basis of the active authentication.

According to at least one embodiment, access is approved by the authentication unit if the active authentication is performed successfully.

According to at least one embodiment, access is not approved by the authentication unit if the active authentication is not performed or not performed successfully.

According to at least one embodiment, access to the mobile electronic device is disabled by the mobile electronic device or by the computer system if the active authentication is not performed or not performed successfully.

According to at least one embodiment, an algorithm for determining the confidence value is adjusted by the computer system on the basis of the biometric information if the active authentication is performed successfully.

The algorithm is for example multiple predefined rules that are present for example in the form of a computer program and that are performed by the computer system in order to determine the confidence value on the basis of the biometric information. For example, the algorithm also includes the selection of the reference data.

According to at least one embodiment, the reference data for determining the confidence value are adjusted by the computer system on the basis of the biometric information if the active authentication is performed successfully.

As a result of the active authentication having been performed successfully even though the confidence value was less than the predetermined minimum value, it may be inferred that the biometric information recorded in the specific case supports the authenticity of the user.

In this way, the algorithm and the reference data are subject to a learning process on the basis of the biometric information.

The longer and more systematically the biometric information is recorded and if necessary, compared using active authentication processes, as described, the more rarely the confidence value will be less than the predetermined minimum value, provided that the legitimate user carries the device. Accordingly, the frequency of cases in which an active authentication by the legitimate user is necessary is also reduced.

According to at least one embodiment, during the logging period the device is used to detect two or more different biometric characteristics of the user in order to acquire the biometric information. Each of the two or more biometric characteristics is taken as a basis for determining a respective individual confidence value for the authenticity of the user by the computer system. The confidence value is determined by the computer system on the basis of the individual confidence values.

The confidence value may thus be regarded as an overall confidence value fueled by at least two individual confidence values. By way of example, a mean value, a sum, a weighted mean value or a weighted sum may be formed from the individual confidence values in order to determine the confidence value.

A biometric characteristic may for example be understood to mean an anthropometric characteristic, a biological characteristic or a behavioral characteristic of the user, each of which is measurable using one or more sensors.

Taking at least two different biometric characteristics into consideration may allow higher reliability and ultimately higher security for the method. An individual characteristic may not guarantee the authenticity of the user with sufficient certainty, depending on which characteristic is used. However, the cumulation of multiple biometric characteristics allows a very reliable profile of the user to be created and the authenticity of the user to be rated correctly with a very high level of probability.

The two or more different biometric characteristics may include three, four, five or more different biometric characteristics.

According to at least one embodiment, the two or more biometric characteristics are each detected by at least one sensor of the device and/or by at least one sensor coupled to the device.

For example, the characteristics are detected in an automated manner, with the result that the user does not have to take action to acquire the biometric information for the purposes of authentication or production of the confidence value.

By way of example, use of the mobile electronic device, for example the mobile phone and the user interfaces or sensors thereof, as intended may be used to acquire the biometric information in the background.

According to at least one embodiment, the two or more biometric characteristics are each determined by one or more microphones, one or more inertial sensors, a position sensor, a heart rate sensor, a pulse oximeter, a conductivity sensor, a temperature sensor, a fingerprint sensor, one or more cameras, and/or one or more touch sensors.

According to at least one embodiment, the at least one sensor of the device and/or the at least one sensor coupled to the device includes one or more microphones, one or more inertial sensors, a position sensor, a heart rate sensor, a pulse oximeter, a conductivity sensor, a temperature sensor, a fingerprint sensor, one or more cameras, and/or one or more touch sensors.

The microphone(s) may be used to determine a voice profile or voice pattern, for example.

The inertial sensor(s), that may be configured as acceleration and/or rotation rate sensors, for example, may for example be used to detect movement characteristics, a gait, a walking rhythm, a pace length and/or arm movements, that is to say an arm movement amplitude, of the user.

The position sensor, that may be configured as a GNSS or GPS sensor, for example, may for example be used to create a movement profile or to identify locations of the user.

The heart rate sensor may for example be used to determine a heart rhythm or a pulse rate of the user or thus indirectly a present state of health or other condition of the user.

The pulse oximeter may for example be used to determine an oxygen saturation in the blood of the user.

The conductivity sensor may be of capacitive design, for example, and may for example be used to determine a body fat percentage and/or a skin conductivity of the user.

The temperature sensor may for example be used to determine a skin or body temperature of the user.

The camera or the cameras may for example be used to identify a facial geometry of the user.

The touch sensors, for example implemented in a touch-sensitive display of the electronic device, may for example be used to determine an ear shape or a keystroke behavior of the user.

According to at least one embodiment, the two or more biometric characteristics include a voice pattern of the user, a movement profile of the user, an activity pattern of the user, a heart rhythm of the user, a body fat percentage of the user, a skin conductivity of the user, a walking rhythm of the user, a pace length of the user, arm movements of the user, a fingerprint of the user, a facial geometry of the user, an ear shape of the user, and/or a keystroke behavior of the user.

According to at least one embodiment, the two or more biometric characteristics include a breathing pattern of the user, an image or characteristic of an iris of the user, a vein pattern of the user, for example a vein pattern of a fundus of the eye, of a hand and/or of another body part of the user, eye movements of the user, blinking of the user, facial expressions of the user, and/or a characteristic unconscious movement of the user.

For example, the two or more biometric characteristics each include a trend or a temporal mean value or another statistical variable of one or more of the aforementioned characteristics.

The aforementioned characteristics may verify, or refute, the authenticity of the user with a very high level of probability on their own or in various combinations.

According to at least one embodiment, access is approved by the authentication unit on the basis of an identity and/or on the basis of a state of the user.

For example, access is approved on the basis of the identity or the state if access to the apparatus is automatically approved if the confidence value is greater than or equal to the predetermined minimum value or if the active authentication is performed successfully.

In such embodiments, various access categories may be defined, that means that role-dependent access to the apparatus becomes possible. Depending on who the user to whom access is supposed to be granted is, different access categories each having different access rights may be approved.

Accordingly, one of the access categories may also be selected on the basis of the state, or the physical constitution, of the user.

This means that it becomes possible for example to grant access to the apparatus only on a restricted basis, for example to grant only read access if it is established that the user is in bad shape or is very tired.

This allows firstly personal safety to be increased and also the risk of incorrect operation of the apparatus to be reduced.

According to at least one embodiment, the biometric information is wirelessly transmitted to the computer system by the device and the confidence value or a signal that is dependent on the confidence value or data that are produced on the basis of the confidence value is transmitted to the authentication unit by the computer system.

For example, a server or backend server contains the computer system. The server is for example a further computer system that provides resources for data processing or data storage in order to determine the confidence value.

The electronic device is thus used to collect the biometric information and to transmit it, for example wirelessly, to the server. The authentication, for example the ascertainment of the confidence value, therefore takes place online to a certain degree.

Such embodiments advantageously require no increased processing capacity on the mobile electronic device.

According to at least one embodiment, the confidence value or the signal that is dependent on the confidence value or the data that are produced on the basis of the confidence value is wirelessly transmitted to the authentication unit by the device and the device includes the computer system.

In such embodiments, the computer system may be configured as a microprocessor unit of the device, for example.

Accordingly, the biometric information is collected and evaluated by the device by determining the confidence value. This is thus offline authentication to a certain degree.

Such embodiments have the advantage that a wireless communication connection to a server is not necessary.

According to an embodiment, a system for user authentication is provided that includes a computer system and an authentication unit. The system for user authentication additionally includes a mobile electronic device, that is configured to acquire biometric information of a user of the device during a logging period. The computer system is configured to take the biometric information as a basis for determining a confidence value for an authenticity of the user. The authentication unit is configured to establish that the device is located in predetermined surroundings of an access-protected apparatus and to approve access to the apparatus on the basis of the confidence value.

According to at least one embodiment of the system for user authentication, the system includes at least one server that includes the computer system. The device is configured to wirelessly transmit the biometric information to the computer system and the computer system is configured to transmit the confidence value or a signal that is dependent on the confidence value to the authentication unit, for example wirelessly or by wire.

According to at least one embodiment, the device includes the computer system and is configured to wirelessly transmit the confidence value or a signal that is dependent on the confidence value to the authentication unit.

Further embodiments of the system for user authentication result directly from the method for user authentication and the applicable configurations, and vice versa. For example, the system may be configured or programmed to perform a method, or a system performs a method as described herein.

According to an embodiment, a software system for user authentication is provided. The software system includes a first computer program containing first instructions that, when the first computer program is executed by a mobile electronic device, for example of a system for user authentication, cause the electronic device to acquire biometric information of a user of the device during a logging period.

According to at least one embodiment, the software system includes a second computer program containing second instructions that, when the second computer program is executed by a computer system, for example a computer system of a system for user authentication, cause the computer system to take the biometric information as a basis for determining a confidence value for an authenticity of the user.

According to at least one embodiment, the software system includes a third computer program containing instructions that, when the third computer program is executed by an authentication unit, for example an authentication unit of a system for user authentication, cause the authentication unit to establish that the device is located in predetermined surroundings of an access-protected apparatus and to approve access to the apparatus on the basis of the confidence value.

The software system, for example the first, the second and/or the third computer program, is or are for example stored on one or more computer-readable storage media, for example of the system for user authentication.

In at least one embodiment of the software system, when the first computer program is executed by the electronic device the first instructions cause the electronic device to perform all of the respectively required method steps of a method that are performed by the electronic device in accordance with the respective embodiment of the method.

In at least one embodiment of the software system, when the second computer program is executed by the computer system the second instructions cause the computer system to perform all of the respectively required method steps of a method that are performed by the computer system in accordance with the respective embodiment of the method.

In at least one embodiment of the software system, when the third computer program is executed by the authentication unit the third instructions cause the authentication unit to perform all of the respectively required method steps of a method that are performed by the authentication unit in accordance with the respective embodiment of the method.

Further embodiments of the software system arise directly from the various embodiments of the method, or of the system for user authentication, and vice versa in each case.

According to an embodiment, a computer-readable storage medium or a set of computer-readable storage media is specified that stores a software system, for example the first, the second and the third computer program.

For example, the set of computer-readable storage media comprises a first, a second and a third computer-readable storage medium. The first storage medium stores the first computer program, the second storage medium stores the second computer program, and the third storage medium stores the third computer program.

Alternatively, two or all three of the computer programs may also be stored on a common storage medium.

Embodiments are explained more thoroughly below with reference to specific embodiments and associated schematic drawings. Identical or functionally identical elements in the figures may be provided with the same reference signs. The description of identical or functionally identical elements may not necessarily be repeated for different figures.

DETAILED DESCRIPTION

Figure 1:
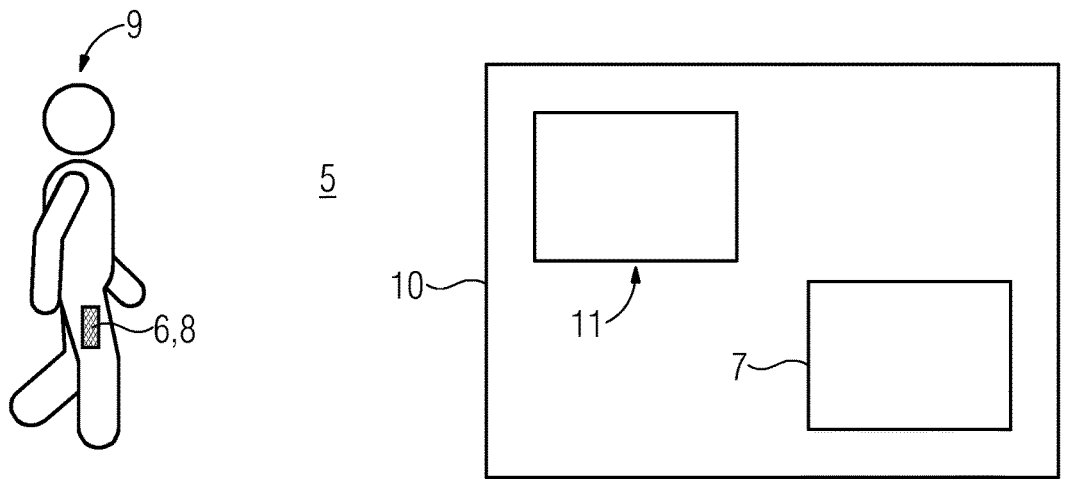
FIG. 1 depicts a schematic depiction of an embodiment of a system.

FIG. 1 depicts a schematic depiction of an embodiment of a system 5 for user authentication. The system 5 includes a mobile electronic device 8, that for example may be in the form of a smartphone or the like and may be carried by a user 9.

The device 8 includes a computer system 6, that for example may also be configured as a processing unit of the smartphone.

FIG. 1 also depicts an apparatus 10, for example a machine or installation, that is access-protected against unauthorized use.

The system 5 includes an authentication unit 7, that for example may be configured as a computing unit of the apparatus 10.

The apparatus 10 includes a display 11.

Figure 2:
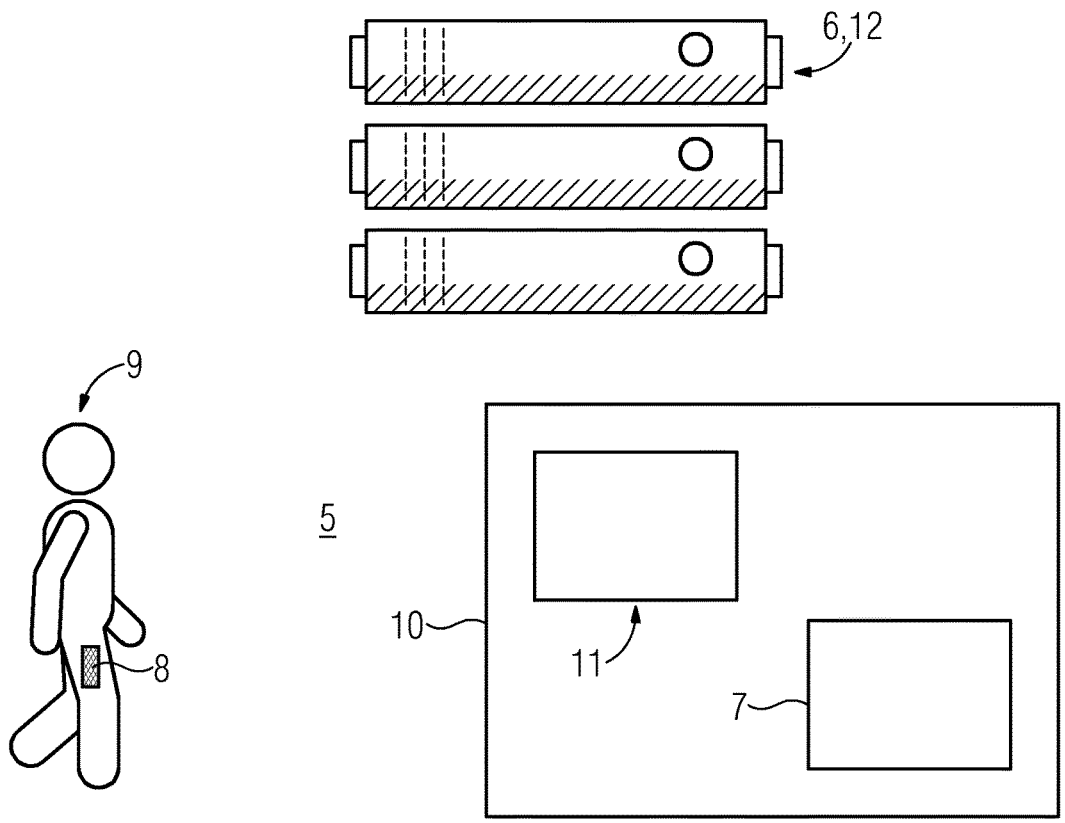
FIG. 2 depicts a schematic depiction of an embodiment of a system.

FIG. 2 depicts a schematic depiction of an embodiment of a system for user authentication 5.

In addition to the system 5 of FIG. 1, the system 5 of FIG. 2 includes a server 12. The computer system 6 of the system 5 is configured as a computing unit of the server 12 in this embodiment.

The manner of operation of the systems 5 shown in FIG. 1 and FIG. 2 is explained more thoroughly below with reference to embodiments of methods shown in FIG. 3 and FIG. 4.

Figure 3:
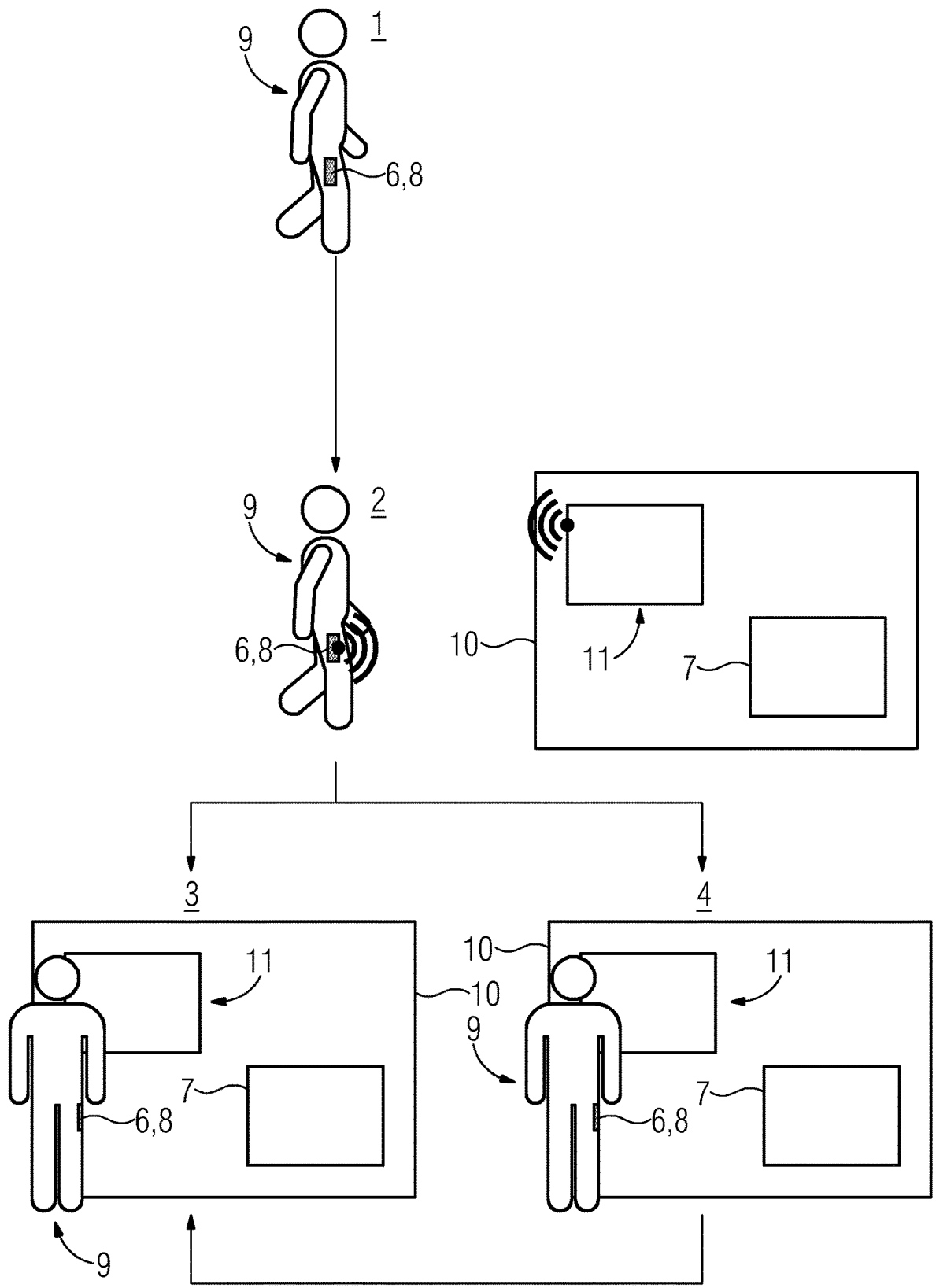
FIG. 3 depicts a flowchart for an embodiment of a method.

FIG. 3 depicts a flowchart for a method for user authentication, that makes use of an embodiment of the system 5 for user authentication shown in FIG. 1.

In step 1 of the method, the mobile device 8 records biometric information of the user 9 during a logging period. This may for example be accomplished by using one or more sensors of the device 8, or sensors coupled to the device 8. For example, microphones, acceleration or rotation rate sensors, fingerprint sensors, cameras or the like may be used to detect a voice pattern, a movement profile or activity pattern, a fingerprint or the like of the user as biometric characteristics belonging to the biometric information.

During the logging period, the computer system 6 is used to repeatedly or continuously determine a confidence value for the authenticity of the user 9 on the basis of the biometric information. This is accomplished by comparing the biometric information with already known reference data, that for example may have been logged earlier and may be independent. For example, the individual biometric characteristics may be compared with respective reference datasets in order to determine respective individual confidence values. The computer system 6 may then determine the confidence value from the individual confidence values.

The continuous recording of the biometric information during the logging period allows the algorithm for determining the confidence value, or allows the reference data, to be continually adapted, with the result that the determination of the confidence value and the assessment of the authenticity of the user on the basis of the biometric information become more and more accurate over time and the confidence value may for example become greater over time.

In step 2 of the method, the user 9 with the device 8 approaches the apparatus 10. This is for example detected by the authentication unit 7, that may communicate with the device 8 wirelessly. The device 8, or the computer system 6, transmits the confidence value or authentication data produced on the basis thereof to the authentication unit 7. The authentication data may contain the confidence value itself, a user ID, a software ID, a device ID, a temporary access key, a username and/or a password on an implementation-specific basis.

The authentication unit 7 then for example compares the confidence value with a predetermined minimum value. If the confidence value is greater than or equal to the predetermined minimum value, access to the apparatus 10 is automatically approved in step 3 of the method.

If the confidence value is less than the predetermined minimum value, however, then in step 4 of the method the authentication unit 7 asks the user 9 to perform an active authentication action. By way of example, the authentication unit 7 may display an appropriate instruction and appropriate advice on the display 11 of the apparatus 10. By way of example, the user 9 may be asked to enter a password or a PIN or to provide a fingerprint or to perform a facial identification or another authentication action. If the user 9 then performs the active authentication action successfully, access to the apparatus 10 is likewise approved by the authentication unit 7.

If the user 9 does not perform the active authentication action or does not perform it successfully, on the other hand, then access to the apparatus 10 remains disabled.

In an embodiment, a username and a password are in a piece of software on the device 8. The authentication unit 7 requests the authentication data from the software. The software produces the confidence value internally, as described, and conveys the access data, stored for the apparatus 10 in internally encrypted form, if the minimum value for the confidence value is exceeded. In this case, the method would be passive and could also be integrated into existing systems particularly easily.

Figure 4:
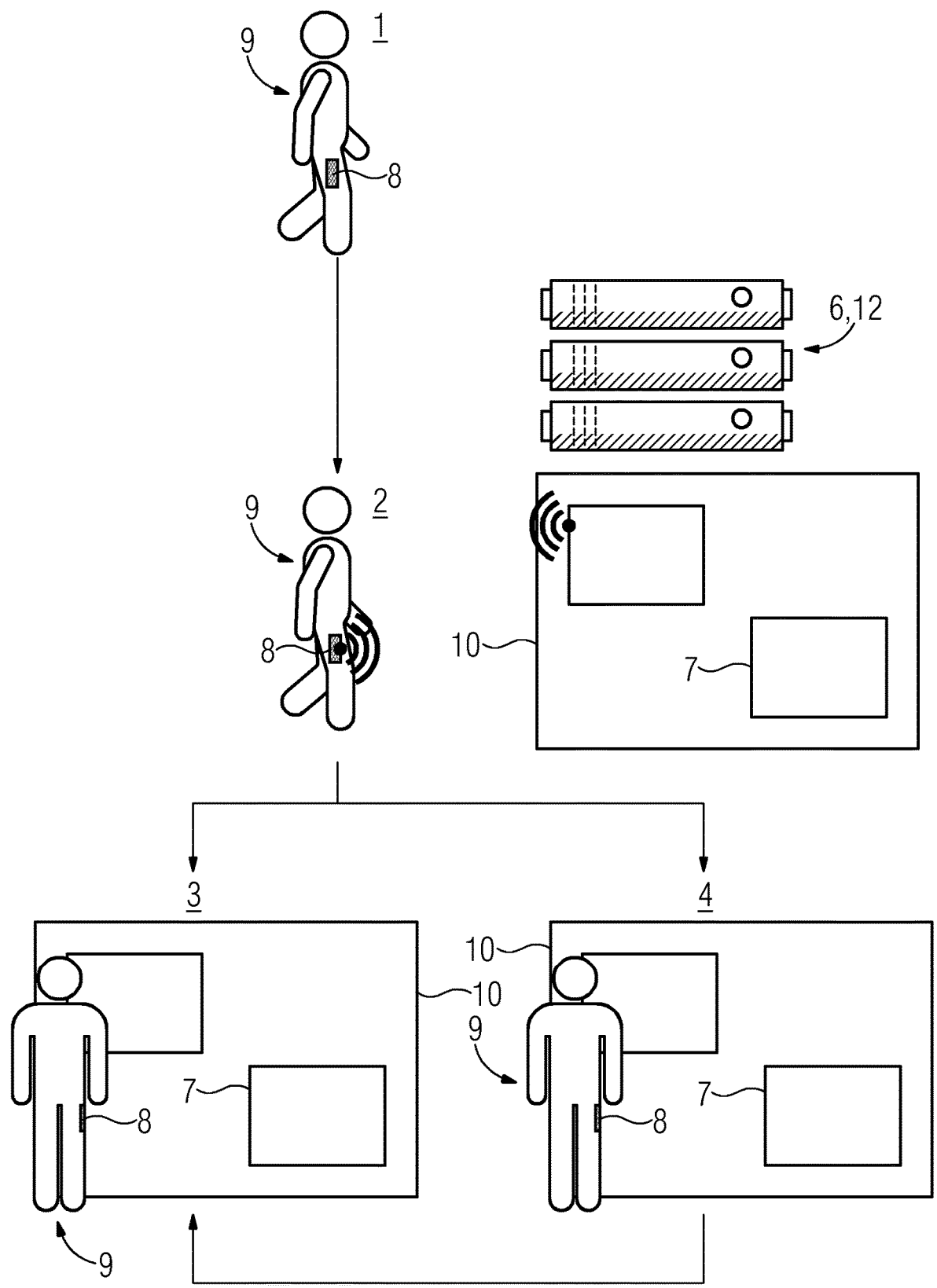
FIG. 4 depicts a flowchart for an embodiment of a method.

FIG. 4 depicts a flowchart for an embodiment of a method for user authentication.

The method uses for example a system for user authentication as shown in FIG. 2. The computer system 6 is therefore configured as a computing unit of the server 12, as described.

In step 1 of the method, for example the device 8 transmits the acquired biometric information to the server 12, and the computer system 6 of the server 12 then determines the confidence value. In addition, step 1 of the method tallies with that of the method shown in FIG. 3.

In step 2 of the method, the authentication unit 7 requests the confidence value from the server 12, or the computer system 6.

In addition, method steps 2 to 4 tally with those of the method shown in FIG. 3.

In an embodiment, the user 9 approaches the apparatus 10. The authentication unit 7 detects the device 8 and sends a query containing a corresponding device ID to the server 12. The server takes the confidence value as a basis for reporting back for example that a particular user 9 currently has a particular probability of being in possession of the device 8. If the authentication unit 7 establishes for example that the probability is not sufficient for approval and reports this back to the server 12. The server 12 then asks the device 8 to have the user 9 authenticate himself there manually. This increases the probability of him being the intended user 9. After this has been done, the server 12 updates applicable reference values, for example, and sends the updated data to the apparatus 10. If the probability is high enough this time, approval is given.

User authentication using multiple factors is described. The mobile device, or an app on the mobile device, for example continually guarantees that the mobile device is being carried by its legitimate owner. This is accomplished by using biometric methods. Accordingly, it is not enough to merely possess the mobile electronic device in order to gain access to the apparatus.

A system may, in various embodiments, monitor the user for loss of consciousness and may for example disable access to the apparatus in the event of the user having lost consciousness and/or may change a mode of operation of the apparatus in the event of a loss of consciousness.

Besides access to the apparatus, it is also possible to approve or disable applications stored on the mobile electronic device on the basis of the confidence value or to approve the applications on the basis of an additional active authentication if the user has not been able to be identified definitely as the rightful user on the basis of the biometric information.

Computer applications may be enabled or disabled in the same way.

Embodiments are used to overcome numerous disadvantages of conventional authentication methods. A common feature of these conventional methods is for example that the user needs to take action in order to gain access to the apparatus. This is not the case according to described embodiments.

If for example authentication is performed conventionally using a key switch, by inserting and turning a key, unauthorized parties may obtain the key. Furthermore, known systems provide only one key and hence only one level of permission. If an RFID card is used for authentication, unauthorized parties may use the card. Furthermore, such cards may become faulty. If the user has forgotten the card, he cannot gain access to the apparatus. RFID cards may be passed on by users, with the result that they cannot be associated with the user or operator of the apparatus. Furthermore, security of RFID cards for authentication is limited, since applicable chips may be copied relatively easily.

Authentication by way of a login and password, that is to say by way of the entry of a correct combination of username and password, includes the disadvantage that unauthorized parties may obtain the login and the password, or old combinations continue to be valid. Entry also takes a relatively long time. In the event of keystroke errors, the user needs to perform the authentication action again. In various applications, unfavorable soiling of a user interface of the apparatus as a result of the contact for entering the login and password may be disadvantageous.

Some or all of these and other disadvantages of known authentication methods may be avoided by provided embodiments. This is made possible by using a passive method for authentication and the user having to take action only in exceptional cases. It is normally enough for the user to step up to an operator station of the apparatus with the device.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for user authentication, the method comprising:
   acquiring, by a mobile electronic device, biometric information of a user of the mobile electronic device during a logging period;
   determining, using the biometric information, a confidence value for an authenticity of the user by a computer system;
   establishing, by an authentication unit, that the mobile electronic device is located in predetermined surroundings of an access-protected apparatus; and
   approving or denying, by the authentication unit, access to the access-protected apparatus the confidence value;
   wherein the authentication unit requests an active authentication when the confidence value is less than a predetermined minimum value, and
   wherein an algorithm, reference data, or the algorithm and the reference data for determining the confidence value is adjusted by the computer system based on the biometric information if the active authentication is approved.

2. The method of claim 1, wherein access to the access-protected apparatus is automatically approved by the computer system when the confidence value is greater than or equal to a predetermined minimum value.

3. The method of claim 1, wherein access is approved by the authentication unit if the active authentication is performed successfully.

4. The method of claim 1, wherein during a logging period the mobile electronic device is used to detect two or more different biometric characteristics in order to acquire the biometric information; wherein each of the two or more biometric characteristics is taken as a basis for determining a respective individual confidence value for the authenticity of the user by the computer system; and the confidence value is determined by the computer system on the basis of the individual confidence values.

5. The method of claim 4, wherein the two or more biometric characteristics are each detected by at least one sensor of the mobile electronic device, at least one sensor coupled to the mobile electronic device, or by at least one sensor of the mobile electronic device and at least one sensor coupled to the mobile electronic device.

6. The method of claim 4, wherein the two or more biometric characteristics are each determined by at least one of one or more microphones, one or more inertial sensors, a position sensor, a heart rate sensor, a pulse oximeter, a conductivity sensor, a temperature sensor, a fingerprint sensor, one or more cameras, or one or more touch sensors.

7. The method of claim 4, wherein the two or more biometric characteristics include at least one of a voice pattern, a movement profile, an activity pattern, a heart rhythm, a body fat percentage, a skin conductivity, a walking rhythm, a pace length, arm movements, a fingerprint, a facial geometry, an ear shape, or a keystroke behavior.

8. The method of claim 1, wherein access is approved by the authentication unit based on an identity, a state, or the identify and the state of the user.

9. The method of claim 1, wherein the biometric information is wirelessly transmitted to the computer system by the mobile electronic device and the confidence value or a signal that is dependent on the confidence value or data that are dependent on the confidence value is transmitted to the authentication unit by the computer system; or the confidence value or the signal that is dependent on the confidence value or the data that are dependent on the confidence value is wirelessly transmitted to the authentication unit by the mobile electronic device and the mobile electronic device includes the computer system.

10. A system for user authentication, the system comprising:
    a computer system;
    an authentication unit; and
    a mobile electronic device configured to acquire biometric information of a user of the mobile electronic device during a logging period;
    wherein the computer system is configured to take the biometric information as a basis for determining a confidence value for an authenticity of the user;
    wherein the authentication unit is configured to establish that the mobile electronic device is located in predetermined surroundings of an access-protected apparatus and to approve access to the access-protected apparatus on the basis of the confidence value;
    wherein the authentication unit requests an active authentication when the confidence value is less than a predetermined minimum value, and
    wherein an algorithm, reference data, or the algorithm and the reference data for determining the confidence value is adjusted by the computer system based on the biometric information if the active authentication is approved.

11. The system for user authentication of claim 10, wherein the system further comprises:
    at least one server that includes the computer system; wherein the mobile electronic device is configured to wirelessly transmit the biometric information to the computer system; wherein the computer system is configured to transmit the confidence value or a signal that is dependent on the confidence value or data that are dependent on the confidence value to the authentication unit.

12. The system for user authentication of claim 10, wherein the mobile electronic device includes the computer system and is configured to wirelessly transmit the confidence value or a signal that is dependent on the confidence value or data that are dependent on the confidence value to the authentication unit.

13. A non-transitory computer implemented storage medium that stores machine-readable instructions executable by a mobile electronic device that when executed by the mobile electronic device, cause the mobile electronic device to:
    acquire biometric information of a user of the mobile electronic device during a logging period;
    take, by a computer system, the biometric information as a basis for determining a confidence value for an authenticity of the user;
    establish, by an authentication unit, that the mobile electronic device is located in predetermined surroundings of an access-protected apparatus and to approve access to the access-protected apparatus on the basis of the confidence value; and
    request, by the authentication unit, an active authentication when the confidence value is less than a predetermined minimum value;
    wherein an algorithm, reference data, or the algorithm and the reference data for determining the confidence value is adjusted by the computer system based on the biometric information if the active authentication is approved.

* * * * *